United States Patent
Urakubo et al.

(10) Patent No.: US 8,821,235 B2
(45) Date of Patent: Sep. 2, 2014

(54) NON-TRANSITORY COMPUTER-READABLE STORAGE MEDIUM AND SERVER DEVICE

(71) Applicant: DeNA Co., Ltd., Tokyo (JP)

(72) Inventors: Daiki Urakubo, Tokyo (JP); Hiroshi Koyama, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/864,052

(22) Filed: Apr. 16, 2013

(65) Prior Publication Data

US 2013/0337912 A1    Dec. 19, 2013

(30) Foreign Application Priority Data

Jun. 19, 2012   (JP) ................................. 2012-137995

(51) Int. Cl.
*A63F 9/24*     (2006.01)
*A63F 13/00*    (2014.01)

(52) U.S. Cl.
CPC ....................................... *A63F 13/00* (2013.01)
USPC ........................... 463/9; 463/4; 463/8; 463/31

(58) Field of Classification Search
USPC ........................................................ 463/4, 8
See application file for complete search history.

(56) References Cited

U.S. PATENT DOCUMENTS

| | | | | |
|---|---|---|---|---|
| 5,885,156 A | * | 3/1999 | Toyohara et al. ................. | 463/1 |
| 6,152,821 A | * | 11/2000 | Nakagawa et al. ............... | 463/4 |
| 6,155,924 A | * | 12/2000 | Nakagawa et al. ............... | 463/4 |
| 6,168,519 B1 | * | 1/2001 | Nakagawa et al. ............... | 463/4 |
| 6,270,402 B1 | * | 8/2001 | Fujioka et al. .................... | 463/2 |
| 6,347,993 B1 | * | 2/2002 | Kondo et al. ...................... | 463/1 |
| 6,491,582 B1 | * | 12/2002 | Toyohara et al. ................. | 463/1 |
| 6,606,104 B1 | * | 8/2003 | Kondo et al. ................. | 715/764 |
| 7,022,014 B2 | * | 4/2006 | Namba et al. ..................... | 463/4 |
| 7,300,344 B2 | * | 11/2007 | Fujioka et al. .................... | 463/4 |
| 7,938,718 B2 | * | 5/2011 | Maeda et al. ...................... | 463/3 |
| 7,970,663 B2 | * | 6/2011 | Ganz et al. ................. | 705/26.61 |

(Continued)

FOREIGN PATENT DOCUMENTS

JP    2008-264183 A    11/2008

OTHER PUBLICATIONS

"Baseball Stars II" for NES Entertainment System, Copyright 1992 by Romstar.*

*Primary Examiner* — Steven J Hylinski
(74) *Attorney, Agent, or Firm* — Rothwell, Figg, Ernst & Manbeck, P.C.

(57) ABSTRACT

A game program according to the invention instructs a computer to perform the following processes: a reception process in which a building request that requests building of a character group into which a plurality of characters are organized is received from a player terminal that is used by a player when the player plays a game; an image generation process in which a group-building game image is generated in response to the building request, the group-building game image being displayed on a display unit of the player terminal when the player builds the character group, the group-building game image including images of characters owned by the player and pieces of suggesting information that causes the player to estimate an attribute set for each of these characters; and a process in which the group-building game image generated in the image generation process is sent to the player terminal.

6 Claims, 12 Drawing Sheets

(56) References Cited

U.S. PATENT DOCUMENTS

| | | | |
|---|---|---|---|
| 8,272,961 B2* | 9/2012 | Busey et al. | 463/42 |
| 2001/0005689 A1* | 6/2001 | Fujioka et al. | 463/4 |
| 2002/0103016 A1* | 8/2002 | Namba et al. | 463/4 |
| 2007/0149266 A1* | 6/2007 | Arakawa et al. | 463/8 |
| 2007/0203591 A1* | 8/2007 | Bowerman | 700/90 |
| 2008/0287196 A1* | 11/2008 | Miki et al. | 463/42 |
| 2009/0186679 A1* | 7/2009 | Irvine et al. | 463/16 |
| 2013/0165197 A1* | 6/2013 | Glikmann | 463/9 |

* cited by examiner

| CARD ID | CHARACTER NAME | CHARACTER IMAGE | INITIAL SPEECH ID | SKILL | INITIAL ATTACK POWER | INITIAL DEFENSE POWER | INITIAL HIT POINT |
|---|---|---|---|---|---|---|---|
| 001 | CHARACTER A | | 001 | A | 15 | 8 | 10 |
| 002 | CHARACTER B | | 010 | B | 30 | 20 | 15 |
| 003 | CHARACTER C | | 006 | A | 45 | 30 | 25 |
| 004 | CHARACTER D | | 025 | C | 20 | 15 | 20 |
| ... | ... | ... | ... | ... | ... | ... | ... |

FIG. 4

| USER ID | OWNED CARD INFORMATION | DECK INFORMATION | ILLUSTRATION INFORMATION |
|---|---|---|---|
| 1 | OWNED CARD INFORMATION(1) | DECK INFORMATION(1) | ILLUSTRATION INFORMATION(1) |
| 2 | OWNED CARD INFORMATION(2) | DECK INFORMATION(2) | ILLUSTRATION INFORMATION(2) |
| 3 | OWNED CARD INFORMATION(3) | DECK INFORMATION(3) | ILLUSTRATION INFORMATION(3) |
| ⋮ | ⋮ | ⋮ | ⋮ |

FIG. 5

OWNED CARD INFORMATION(1)

| OWNED CARD ID | SPEECH ID | LEVEL | ATTACK POWER | DEFENSE POWER | HIT POINT |
|---|---|---|---|---|---|
| 0011 | 0050 | Lv.3 | 25 | 100 | 60 |
| 0211 | 0061 | Lv.4 | 70 | 70 | 80 |
| 0133 | 0101 | Lv.7 | 60 | 300 | 100 |
| ⋮ | ⋮ | ⋮ | ⋮ | ⋮ | ⋮ |

FIG. 6

| DECK INFORMATION(1) | | |
|---|---|---|
| DECK ID | CARD ID | DEADLY TECHNIQUE ID |
| 1 | 0005,0007,0010 | 1 |
| 2 | 0031,0065,0101 | 2 |
| 3 | 0009,0026,0155 | 3 |
| ⋮ | ⋮ | ⋮ |

FIG. 7

| SKILL | SPECIAL EFFECT (DEADLY TECHNIQUE ID) |
|---|---|
| A | 1〜3 |
| B | 4〜6 |
| C | 7〜9 |
| ⋮ | ⋮ |

FIG. 8

| ILLUSTRATION INFORMATION(1) | |
|---|---|
| DEADLY TECHNIQUE ID | FLAG |
| 1 | TRUE |
| 2 | FALSE |
| 3 | TRUE |
| 4 | FALSE |
| 11 | FALSE |
| 12 | TRUE |
| . | . |
| . | . |
| . | . |

FIG. 9

| SPEECH ID | TEXT |
|---|---|
| 001 | SPEECH A |
| 002 | SPEECH B |
| 003 | SPEECH C |
| ⋮ | ⋮ |

FIG. 10

| DEADLY TECHNIQUE ID | TECHNIQUE NAME | ACTIVATION RATE | ATTACK POWER | HINT |
|---|---|---|---|---|
| 1 | DEADLY TECHNIQUE A | 80% | 100 | HINT A |
| 2 | DEADLY TECHNIQUE B | 25% | 700 | HINT B |
| 3 | DEADLY TECHNIQUE C | 30% | 600 | HINT C |
| ⋮ | ⋮ | ⋮ | ⋮ | ⋮ |

FIG. 11

NON-TRANSITORY COMPUTER-READABLE STORAGE MEDIUM AND SERVER DEVICE

CROSS REFERENCE TO RELATED APPLICATIONS

The present application claims priority from Japanese Patent Application No. 2012-137995 filed on Jun. 19, 2012 which is incorporated herein by reference.

BACKGROUND

1. Technical Field

The invention relates to a non-transitory computer-readable storage medium, and a server device.

2. Related Art

There is known a game program which instructs a computer to execute a game which is played by a player using game contents such as a character card (i.e., Japanese Patent Application Laid-open Publication No. 2008-264183).

In the game program, generated is a group-building game image for building a character group into which characters set for the game contents are organized. In the group-building game image, the attributes of the characters used for building the character group are displayed in a direct manner. Therefore, a user tends to organize a group of a plurality of the characters based on the attributes displayed in the direct manner. This has caused a problem that the characters used for building a character group fall into a few fixed groups.

SUMMARY

The invention has been made in view of the above problems, and an advantage thereof is to avoid falling into a few fixed groups of the characters used for building a character group.

An aspect of the invention to solve the above problem and other problems is, a non-transitory computer-readable storage medium, with a game program stored thereon, the game program instructing a computer having a processor and a memory to perform the following processes:

- a reception process in which a building request that requests building of a character group into which a plurality of characters are organized is received from a player terminal that is used by a player when the player plays a game;
- an image generation process in which a group-building game image is generated in response to the building request,
  - the group-building game image being displayed on a display unit of the player terminal when the player builds the character group,
  - the group-building game image including
    - images of characters owned by the player and
    - pieces of suggesting information that causes the player to estimate an attribute set for each of these characters; and
- a process in which the group-building game image generated in the image generation process is sent to the player terminal.

Other features of the invention will become clear through the detailed description of the present invention and the accompanying drawings.

BRIEF DESCRIPTION OF THE DRAWINGS

FIG. 4 illustrates an example of a data structure of card information.

FIG. 5 illustrates an example of a data structure of user information.

FIG. 6 illustrates an example of a data structure of owned-card information.

FIG. 7 illustrates an example of a data structure of deck information.

FIG. 8 is a table showing determination conditions of special effects.

FIG. 9 illustrates an example of a data structure of illustration-list information.

FIG. 10 illustrates an example of a data structure of speech information.

FIG. 11 illustrates an example of a data structure of special effect information.

DETAILED DESCRIPTION OF THE INVENTION

Figure 1:
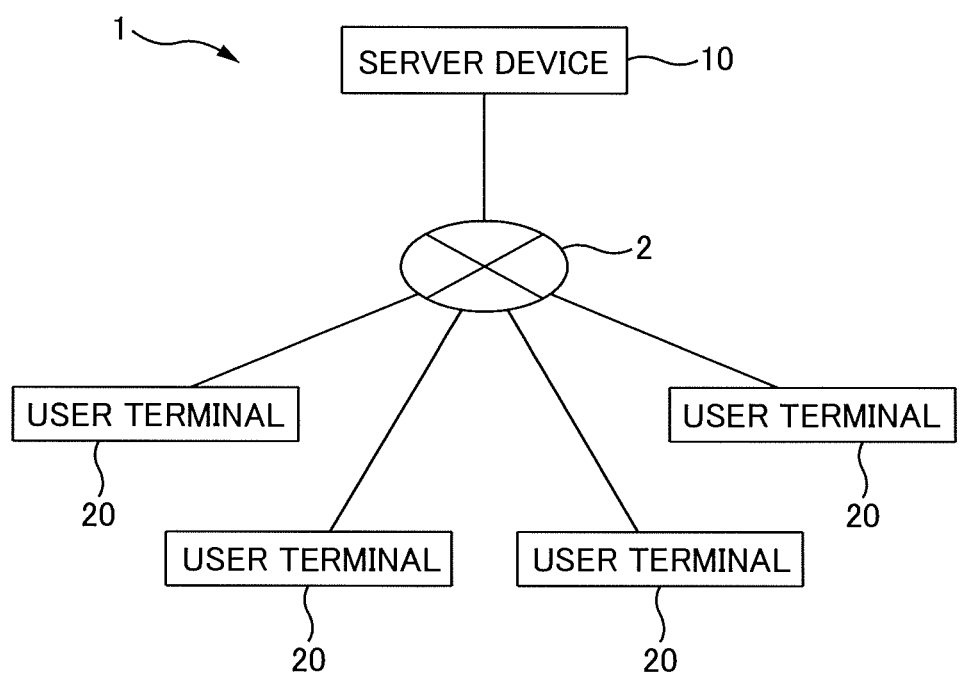
FIG. 1 is an example of an overall configuration of a game system 1 according to the present embodiment.

The problems and solutions of the present invention will become clear through the detailed description of the present invention and the accompanying drawings.

That is, a non-transitory computer-readable storage medium, with a game program stored thereon, the game program instructing a computer having a processor and a memory to perform the following processes:

- a reception process in which a building request that requests building of a character group into which a plurality of characters are organized is received from a player terminal that is used by a player when the player plays a game;
- an image generation process in which a group-building game image is generated in response to the building request,
  - the group-building game image being displayed on a display unit of the player terminal when the player builds the character group,
  - the group-building game image including
    - images of characters owned by the player and
    - pieces of suggesting information that causes the player to estimate an attribute set for each of these characters; and
- a process in which the group-building game image generated in the image generation process is sent to the player terminal.

With such a game program, when the player builds the character group, the player estimates the attributes associated with the characters and uses various characters. This makes it possible to avoid falling into a few fixed groups of the characters used for building a character group.

In such a non-transitory computer-readable storage medium, when attributes set for a plurality of characters constituting the character group are related to each other, the game program instructing the computer to perform a process in which a special effect is produced in the character group.

With such a game program, when the player builds his/her character group, the player builds a character group in which the special effect can be activated. This encourages the player to estimate the attributes associated with the characters and uses various characters.

In such a non-transitory computer-readable storage medium,
the game program instructing the computer to perform
an image generation process in which a history game image is generated,
the history game image including
a history of the character group that the player has ever built and
an attribute set for characters constituting the character group in which the special effect is produced.

With such a game program, when the player estimates the attributes associated with the characters and uses various characters, the player can consider the history of the character groups.

In such a non-transitory computer-readable storage medium,
the suggesting information is text data containing a character string that causes the player to estimate the attribute set for the character, and
by instructing the computer to perform the image generation process, the group-building game image in which a text containing the character string is placed corresponding to an image of the character is generated.

With such a game program, if it is difficult for a player to estimate the attribute which is set for a character, the suggesting information can be easily changed to a text containing a character string which can cause a player to easily estimate the attribute.

In such a non-transitory computer-readable storage medium,
in the image generation process,
the game program instructing the computer to perform a process in which
by combining a certain character of the plurality of characters constituting the character group and another character that differs from the certain character, the suggesting information of the certain character is changed, and
the group-building game image including the suggesting information that has been changed is generated.

With such a game program, the suggesting information is changed. Therefore, when the player builds the character group, the player estimates the attributes associated with the characters and uses further various characters. This makes it possible to further avoid falling into a few fixed groups of the characters used for building a character group.

A server device, including:
a reception unit that receives a building request that requests building of a character group into which a plurality of characters are organized, from a player terminal that is used by a player when the player plays a game;
an image generation unit that generates a group-building game image in response to the building request,
the group-building game image being displayed on a display unit of the player terminal when the player builds the character group,
the group-building game image including
images of characters owned by the player and
pieces of suggesting information that causes the player to estimate an attribute set for each of these characters; and
a transmission unit that sends to the player terminal the group-building game image generated by the image generation unit.

With such a server device, when the player builds the character group, the player estimates the attribute associated with the characters and uses various characters. This makes it possible to avoid falling into a few fixed groups of the characters used for building a character group.

Configuration of Game System 1

FIG. 1 is an example of an overall configuration of a game system 1 according to the present embodiment. The game system 1 according to the present embodiment provides various types of services related to games to a user who has been registered as a member (also referred to as "player") over a network 2. The user can play a game transmitted over the network 2 by accessing the game system 1. The user can also register other users as friends on a friend list by accessing the game system 1. In this way, the game system 1 encourages communication between a plurality of users by allowing the users to play games and exchange messages with users who have become friends.

The game system 1 according to the present embodiment includes a server device 10 and a plurality of user terminals 20 (also referred to as "player terminals"). The server device 10 and the user terminals 20 are each connected to the network 2 and are able to communicate with each other. The network 2 is, for example, the Internet, a local area network (LAN), or a value added network (VAN) established by Ethernet (trademark) or a public switched telephone network, a radio communication network, or a mobile phone network.

The server device 10 is an information processing device used by a person such as a system administrator when managing and controlling the game service. The server device 10 is, for example, a workstation or personal computer and is able to distribute various types of information to the user terminals 20 in response to various commands (requests) transmitted from those user terminals 20. When a distribution request for game contents is received from a user terminal 20 used by a user playing a game, the server device 10 according to the present embodiment is able to distribute in accordance with the request the following game contents: a game program that is operable on the user terminal 20; a web page which is generated by a mark-up language (HTML and the like) suited to the standards of the user terminal; and the like.

The user terminal 20 is an information processing device used by a user when playing a game. The user terminal 20 may be, for example, a mobile telephone terminal, a smartphone, a personal computer, or a game device and the like. The user terminal 20 is able to send a distribution request for various types of information (e.g., game contents such as game programs and web pages) related to the game to the server device 10 that is accessible over the network 2. The user terminal 20 also has a web browser function for allowing users to view web pages. Therefore, when web pages (e.g., game image) linked to, for example, image data related to a game are distributed from the server device 10, the user terminals 20 are able to display the web pages on screens.

Configuration of Server Device 10

Figure 2:
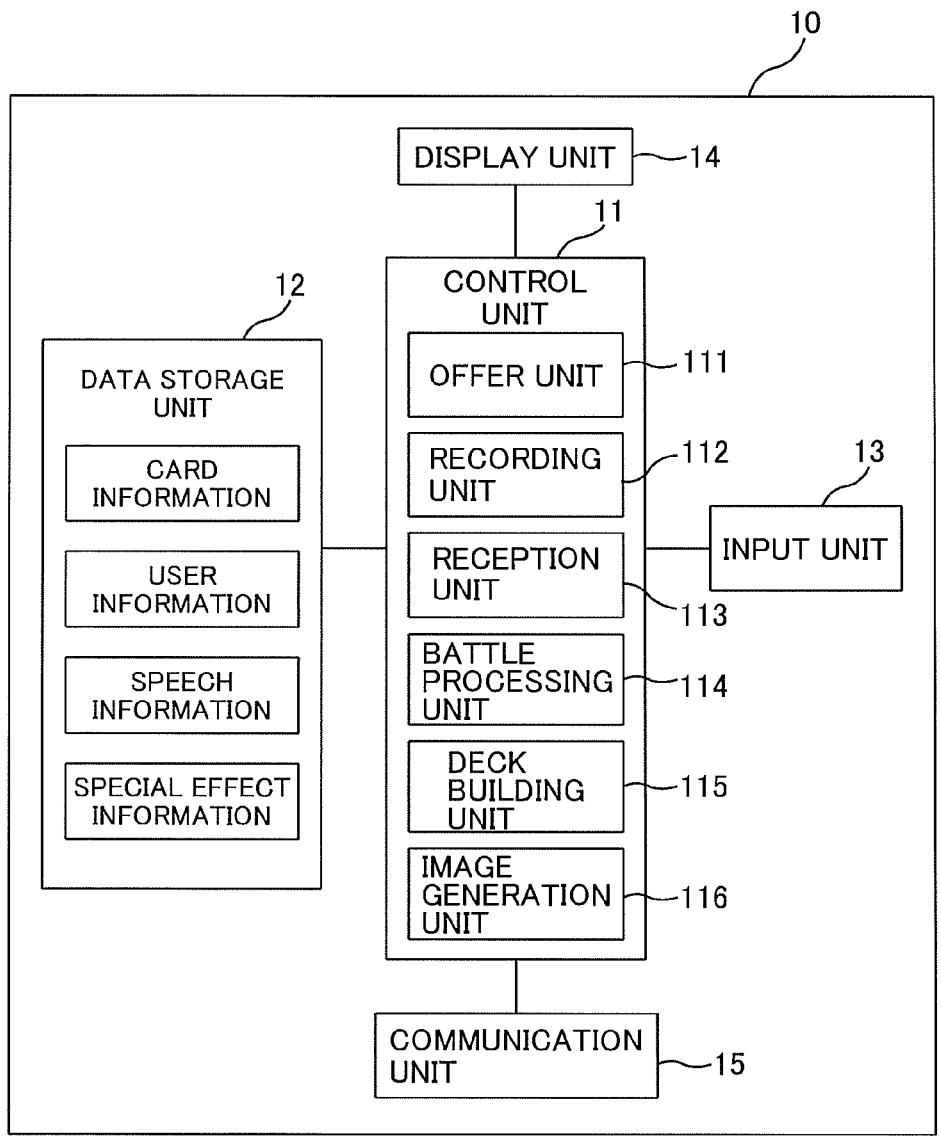
FIG. 2 is a block diagram of a functional configuration of a server device 10 according to the present embodiment.

FIG. 2 is a block diagram of a functional configuration of a server device 10. The server device 10 according to the present embodiment includes a control unit 11, a data storage unit 12, an input unit 13, a display unit 14, and a communication unit 15.

The control unit 11 is a unit that transfers data among the units and controls the entire server device 10, and is realized by a central processing unit (CPU) executing a program stored in a certain memory. Specifically, the control unit 11 has a function to execute various controls and information processes related to the game system 1 such as various processes to provide a game service and various processes to respond to requests from the user terminals 20. To be more specific, the control unit 11 according to the present embodiment includes an offer unit 111, a recording unit 112, a reception unit 113, a battle processing unit 114, a deck building unit 115, and an image generation unit 116, as shown in FIG. 2.

The offer unit 111 has a function to perform a process for providing user with game contents used in the game. The game contents means digital content; for example, an item correlated to a character such as a game card or a figure.

The recording unit 112 connects to the data storage unit 12 via bus, and has a function to perform a process for recording data in the data storage unit 12 according to instructions from the control unit 11.

The reception unit 113 has a function to perform a process for receiving operational inputs from players. Specifically, the reception unit 113 is able to receive operational inputs from players by the server device 10 receiving operational information (e.g., operational commands) which the players input with the player terminals 20 over a network. For example, the reception unit 113 performs a process for receiving from a player terminal 20 a building request that requests building of a character group (hereinafter referred to as a "deck") into which a plurality of characters are organized.

The battle processing unit 114 has a function to perform a process for determining an outcome of a battle with an enemy character. The battle processing unit 112 also has the following functions: a function to perform an attack process for reducing a value of a hit point parameter of the enemy character when the player attacks the enemy character; and the like.

The deck building unit 115 has a function to perform a process for building a deck of a player, in response to the building request, by organizing into the deck a plurality of characters selected by the player, the building request being sent from the player terminal 20 and that requests building of the deck.

The image generation unit 113 has a function to perform a process for generating various types of image data such as manipulation images and game images; the manipulation images allow players to perform operations for playing the game and the game images includes the enemy character's image and the like. The image generation unit 116 of the present embodiment executes a process which generates the following images: a deck-building game image for being displayed by the terminal display unit 24 of the player terminal 20 when the player builds his/her deck; a history game image including a history of the decks that the player has ever built; and the like.

The data storage unit 12 has a read only memory (ROM) and a random access memory (RAM): the ROM is a read-only storage region in which system programs for the server device 10 are stored, and the RAM is a rewritable storage region in which various types of data (flags and computed values used by the system program) generated by the control unit 11 are stored and which is used as a work area for computing processes performed by the control unit 11. The data storage unit 12 is realized, for example, by a non-volatile storage device such as a flash memory or a hard disk and the like. The data storage unit 12 according to the present embodiment stores card information, user information, speech information, and special effect information: the card information is information related to a game card used by a user in a game; the user information is information related to the user (player); speech information is information related to a speech of the character correlated to each game card; and special effect information is information related to a special effect which is activated with a deck. These pieces of information will be described later in detail.

The input unit 13 is a unit with which a system administrator, etc. input various types of data (e.g., the following card information, etc.), and is realized by a keyboard, a mouse, and the like.

The display unit 14 is a unit which displays operating screens for the system administrator according to commands from the control unit 11, and is realized, for example, by a liquid crystal display (LCD) and the like.

The communication unit 15 is a unit for performing communication with the user terminals 20, and has a function as a reception unit for receiving signals and various data transmitted from the user terminals 20, and a function as a transmission unit for transmitting the signals and various data to the user terminals 20 in accordance with commands from the control unit 11. The communication unit 15 is realized, for example, by a network interface card (NIC) and the like.

Configuration of User Terminal 20

Figure 3:
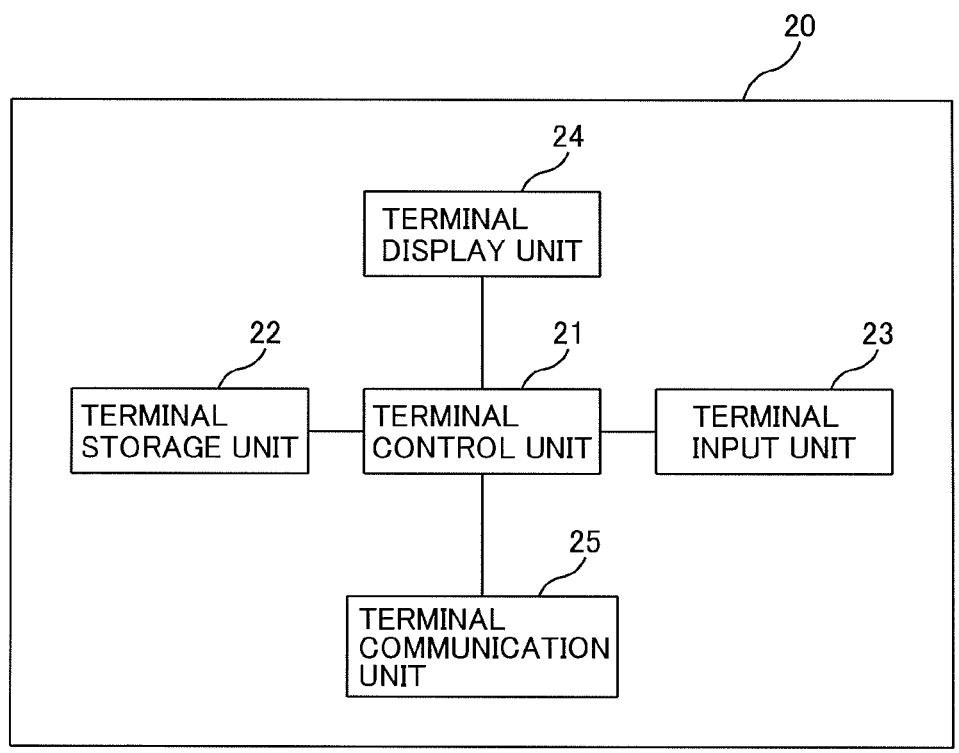
FIG. 3 is a block diagram of a functional configuration of a user terminal 20 according to the present embodiment.

FIG. 3 is a block diagram of a functional configuration of a user terminal 20. The user terminal 20 according to the present embodiment includes a terminal control unit 21, a terminal storage unit 22, a terminal input unit 23, a terminal display unit 24, and a terminal communication unit 25.

The terminal control unit 21 is a unit that transfers data among the units and controls the entire user terminal 20. The terminal control unit 21 is realized by a central processing unit (CPU) executing a program stored in a certain memory. Specifically, the terminal control unit 21 has a function to execute various controls and information processes related to the game system 1 such as various processes for accessing a game site, and various processes for sending requests to the server device 10.

The terminal storage unit 22 has a read only memory (ROM) a random access memory (RAM): the ROM is a read-only storage region in which system programs for the user terminal 20 are stored; and the RAM is a rewritable storage region in which various types of data (flags and computed values used by the system program) generated by the terminal control unit 21 are stored and which is used as a work area for computing processing by the terminal control unit 21. The terminal storage unit 22 is realized, for example, by a non-volatile storage device such as a flash memory or a hard disk and the like. The terminal storage unit 22 is connected to the terminal control unit 21 through a bus. In accordance with commands from the terminal control unit 21, the data stored in the terminal storage unit 22 is looked up, read, and rewritten. In the present embodiment, the terminal storage unit 22 records user IDs and the following game contents which are transmitted from the server device 10: game programs; game data; and the like.

The terminal input unit 23 is a unit with which the user performs various operations (game operations, text input operations, and the like), and is realized, for example, by an operating button, a touchscreen or the like.

The terminal display unit 24 is a unit for displaying a game screen (game play image) generated based on game information according to commands from the terminal control unit 21, and is realized, for example, by a liquid crystal display (LCD) and the like.

The terminal communication unit 25 is a unit that performs communication with the server device 10, and has a function as a reception unit for receiving signals and various data transmitted from the server device 10, and a function as a transmission unit for transmitting the signals and various data to the server device 10 in accordance with commands from the terminal control unit 21. The terminal communication unit 25 is realized, for example, by a network interface card (NIC) and the like.

Game Outline

An outline of the game provided by the game system 1 is described below.

The game system 1 according to the present embodiment is able to provide users (players) with a battle game that is played using the game contents. The following describes a battle card game that is played using a game card as one example of the game contents. Note that this game card serves as digital content, namely a virtual card used in a virtual space in the game.

Battle Card Game

The game system 1 according to the present embodiment is able to provide a battle card game that determines an outcome by allowing a character selected by a player to battle with an enemy character, i.e. an adversary.

Building Deck

In this battle card game, a player first selects a plurality of characters who battle with an enemy character, and thereby designs the deck into which the plurality of characters are organized. In the present embodiment, a player can own a plurality of game cards (virtual cards used in a virtual space of the game). Each of these game cards is correlated to a game character. The player selects a plurality of game cards for building his/her deck, from a plurality of game cards that the player owns. Characters respectively corresponding to the plurality of selected game cards are organized into the deck. In the present embodiment, one deck is built by organizing three game cards (characters) selected by the player. The characters constituting this deck are defined as characters which battle with the enemy character (hereinafter referred to as "player characters").

Characters corresponding to game cards each have a skill as an example of an attribute. When the skills associated with a plurality of the player characters constituting a certain deck are related to each other, a special effect is produced on the deck. In the present embodiment, a deadly attack is designed to be activated in the battle game under a condition that the skills associated with the three player characters constituting a deck are the same.

When a player builds his/her deck, if the skills of the characters are to be displayed in a direct manner on the deck-building game screen for building a deck, it will encourage the player to select only the characters who have the same skill and to build a deck in which a deadly attack can be activated. Therefore, the characters used for building a deck become uniform, which results in a large number of characters that has never been used.

As opposed thereto, in the present embodiment, when a player builds his/her deck, the skills associated with characters are not displayed in the direct manner on the deck-building game screen; instead thereof, displayed is suggesting information which causes the player to estimate the skill of each character. Specifically, on the deck-building game screen, a sentence of text containing a character string which causes the player to estimate the skill of each character is displayed as a speech of the character.

As a result, when the player builds his/her deck, the player cannot identify the skill of the character even if the player reads a speech of the character on the deck-building game screen. That is, the player estimates the skills of the characters using their speeches as clues and uses various characters. This makes it possible to avoid falling into a few fixed groups of the characters used for building a deck.

A concrete procedure for building a deck will be described later in detail.

Outcome of Battle Game

Next, the player characters constituting the deck start a battle game to battle with the enemy character. Specifically, when the player enters a command to perform an attack, the player characters attack on the enemy character according to this command, and the enemy character counter-attacks in response to this attack. The outcome in the battle game is determined based on a life parameter (hit point parameter) which is set for each character. In the present embodiment, the battle game is programmed so that as the value of the life parameter (hit point parameter) is reduced in accordance with the attack power of the opponent, the character whose value reaches zero first is defeated. The battle game proceeds in this manner, and the defeat of the player is determined when all player characters constituting his/her deck has been defeated.

When the outcome in the battle game is determined as mentioned above so that the battle game ends, a game card or a game point is offered to the player based on the battle content and the result of the battle. That is, by playing the battle card game, the player can increase the number of his/her own game cards or a game point.

Combining Game Card

In the battle card game, one of a plurality of the game cards (characters) owned by a player can be combined with another one that differs from the game card.

Combining such a game card as mentioned above makes it possible to change the values of parameters (ability parameters such as the attack power, a defense power, and a hit point) associated with the game card made by the combining.

By combining game cards as mentioned above, the speech set for the game card after combining becomes a different one from the speech set for the certain game card before combining. In the case where the speech of the character changes, the player who is building his/her deck estimates the skill of the character using the changed speech as clues on the deck-building game screen, and uses various characters. This makes it possible to more effectively avoid falling into a few fixed groups of the characters used for building a deck.

Viewing Illustration List

In the battle card game, the player can view a history of the decks that the player has ever built, as an illustration list. In the illustration list, displayed is a list of the decks that the player has ever built; images of the characters constituting each deck, the skills of the characters, the deadly attack of the deck, and the like are displayed for each deck. By viewing the illustration list on the player terminal 20, the player can know a relationship between a set of the characters constituting a deck and a deadly attack which can be activated with the deck. This enables the player to consider it at the time of next building of his/her new deck.

Data Structure

Various types of information used in the game system 1 of the present embodiment will be described with reference to FIGS. 4 to 11. FIG. 4 illustrates an example of a data structure of card information. FIG. 5 illustrates an example of a data structure of user information. FIG. 6 illustrates an example of a data structure of owned-card information. FIG. 7 illustrates an example of a data structure of deck information. FIG. 8 is a table showing determination conditions of the special effects. FIG. 9 illustrates an example of a data structure of illustration-list information. FIG. 10 illustrates an example of a data structure of speech information. FIG. 11 illustrates an example of a data structure of special effect information. In the present embodiment, the card information, the user information, the speech information, the special effect information, etc. are stored in the data storage unit 12 of the server device 10.

Card Information

The card information includes: a card ID which is one example of identification information for identifying a game card; and various types of information related to the game card associated with the card ID. For example, as illustrated in FIG. 4, the card information includes the following items: the name of the character associated with the game card; a character image; an initial speech ID; skill; various types of initial parameters such as an initial attack power, an initial defense power, and an initial hit point; and the like.

The name of each character is determined according to the type of the character such as a warrior or a wizard. This enables users to recognize types of the characters. Character images are image data associated with each of the characters.

The speech ID is information for specifying a speech associated with a character. By referring to speech information (to be described later; see FIG. 10), the speech (text) correlated to a speech ID is specified. The speech that has been specified as mentioned above is correlated to any character and is displayed on a building screen on which a player builds his/her deck. This enables players to estimate the skill of a character using a speech of the character as clues.

The skill is information indicative of the attribute associated with a character. Organizing characters having the same skill into a deck makes it possible to produce a special effect on the deck. The skill of each character can be identified by referring to its card information.

The initial parameters such as the initial attack power are data indicative of initial skill values associated with a character. In the present embodiment, the game program is set so that predetermined values are added to the initial values according to the results of battle games and the progression degrees of the games, etc., which results in increase of the characters' skill values.

The user information includes: a user ID which is one example of identification information for identifying a user (player); and various types of information related to the particular user associated with the user ID. For example, as illustrated in FIG. 5, the user information includes: owned-card information; deck information; illustration-list information; and the like.

The owned-card information is information indicative of cards owned by the user (player). The owned-card information includes: owned card IDs indicative of cards owned by the user; and various types of information related to the owned cards associated with the owned card IDs. For example, as shown in FIG. 6, the owned-card information includes: a speech ID of the character correlated to the game card of each owned card ID; a level; various parameters such as an attack power or a defense power; and the like.

The speech ID is information for identifying the speech of the character correlated to the game card of each owned card ID. By referring to speech information (see FIG. 10) to be described later, the speech (text) correlated to the speech ID is identified. By combining game cards, the speech ID thereof is changed and updated.

The level is information indicative of the level of the character correlated to the game card of each owned card ID. Various types of parameters such as attack power and defense power are data indicative of skill values set for the characters. These levels and various types of parameters such as attack power and defense power are changed and updated in accordance with the result of the battle card game.

The deck information is information indicative of decks built by a player. The deck information includes: a deck ID for identifying the decks built by the player; and various types of information related to the deck correlated to this deck ID. For example, as shown in FIG. 7, the deck information includes card IDs of game cards (characters), a deadly technique ID, and the like.

The card IDs of the game cards (characters) are information for identifying the characters (game cards) constituting the deck correlated to the deck ID. In the present embodiment, three game cards (characters) selected by the player are organized into one deck, and therefore the deck information includes three card IDs correlated to the deck ID.

The deadly technique ID is information for identifying a deadly attack that can be activated with the deck. The deadly technique ID correlated to a deck ID is determined based on the determination conditions of the special effects shown in FIG. 8. In other words, the deadly attack of each deck is determined according to the type of the skill that all characters constituting the deck have. For example, as shown in FIG. 8, if all characters constituting the deck have skill "A", the deadly technique ID is set to any of "1" to "3". The deadly attack correlated to the deadly technique ID that is determined is specified by special effect information (to be described later; see FIG. 11). The special effect information includes a plurality of types of the deadly attacks. Therefore when a player builds his/her deck, the player can try various sets of characters constituting the deck so that various deadly attacks are activated.

The illustration-list information is history information indicative of the history of the deadly attacks that has ever been activated with the decks built by the player. As shown in FIG. 9, the illustration-list information includes: deadly technique IDs of the deadly attacks that have ever been activated; pieces of flag information associated with the deadly technique IDs; and the like. In the present embodiment, the deadly technique ID of a deadly attack that has ever been activated is set to "TRUE", and the deadly technique ID of a deadly attack that has not been activated is set to "FALSE".

The speech information includes: a speech ID, which is an example of identification information for identifying the speech of a character; and various types of information related to the speech correlated to the speech ID. For example, as shown in FIG. 10, the speech information includes items such as text (speech) containing a character string which causes the player to estimate the skill associated with a character. The speech is text data containing the character string which causes the player to estimate the skill associated with the character. This makes it possible to reduce storage requirements in the data storage unit 12 compared to image data.

The special effect information includes: a deadly technique ID, which is an example of identification information for identifying the deadly attack; and various types of information related to the deadly technique correlated to the deadly technique ID. For example, as shown in FIG. 11, the special effect information includes: the name of the deadly technique; an activation rate; an attack power; a hint; and the like.

The name of a deadly technique such as deadly technique A, deadly technique B, and deadly technique C is determined according to types of the techniques, and this causes the player to recognize the type of the deadly attack that is activated with the deck.

The activation rate of a deadly technique is data indicative of a probability that the deadly attack thereof is activated. That is, the deadly attack associated with a deck is activated based on this probability during the battle game. The attack power of a deadly technique is a parameter indicative of the magnitude of the attack power at the time of activating the deadly attack.

The hint is information for giving the player a hint to activate a deadly attack that has not been activated. The hint is text data composed of a character string to give the player the hint. In the present embodiment, a hint associated with a deadly attack that has not been activated is displayed in the illustration list. Viewing this hint gives the player clues to activate a deadly attack that has not been activated.

An example of operations of the game system 1 according to the present embodiment using the various information will be explained below in detail.

Operation of Game System 1

The following describes operations of the game system 1. In the game system 1 according to the present embodiment, the units are controlled and the processes are performed by causing the server device 10 and the player terminals 20 to cooperate based on a game program.

Specifically, the game system 1 executes the following processes: a card-offering process; a card-recording process; a process for causing a player to build his/her deck; card-combining process; a process for causing the player to view the illustration list; and the like. These processes will be explained below.

Card-Offering Process

The card-offering process is one for providing a player with a game card. In the present embodiment, a game card is offered to a player by playing the battle card game. Specifically, the battle processing unit 114 of the server device 10 executes processes of the battle card game to determine the result of the battle and the battle content. Then, based on the result of the battle and the battle content, the offer unit 111 of the server device 10 selects a game card which is offered to the player, from a plurality of the game cards included in card information shown in FIG. 4. Consequently, the offered card that is selected becomes the player's owned card.

Card-Recording Process

The card-recording process is one in which an offered card offered to a player in the card-offering process is recorded as an owned card owned by the player. The recording unit 112 of the server device 10 adds to the owned-card information shown in FIG. 6 the offered card offered to the player in the card-offering process, and the recording unit 112 records the offered card. Thus, the player can increase the number of his/her own game cards.

Process for Causing Player to Build Deck

Figure 12:
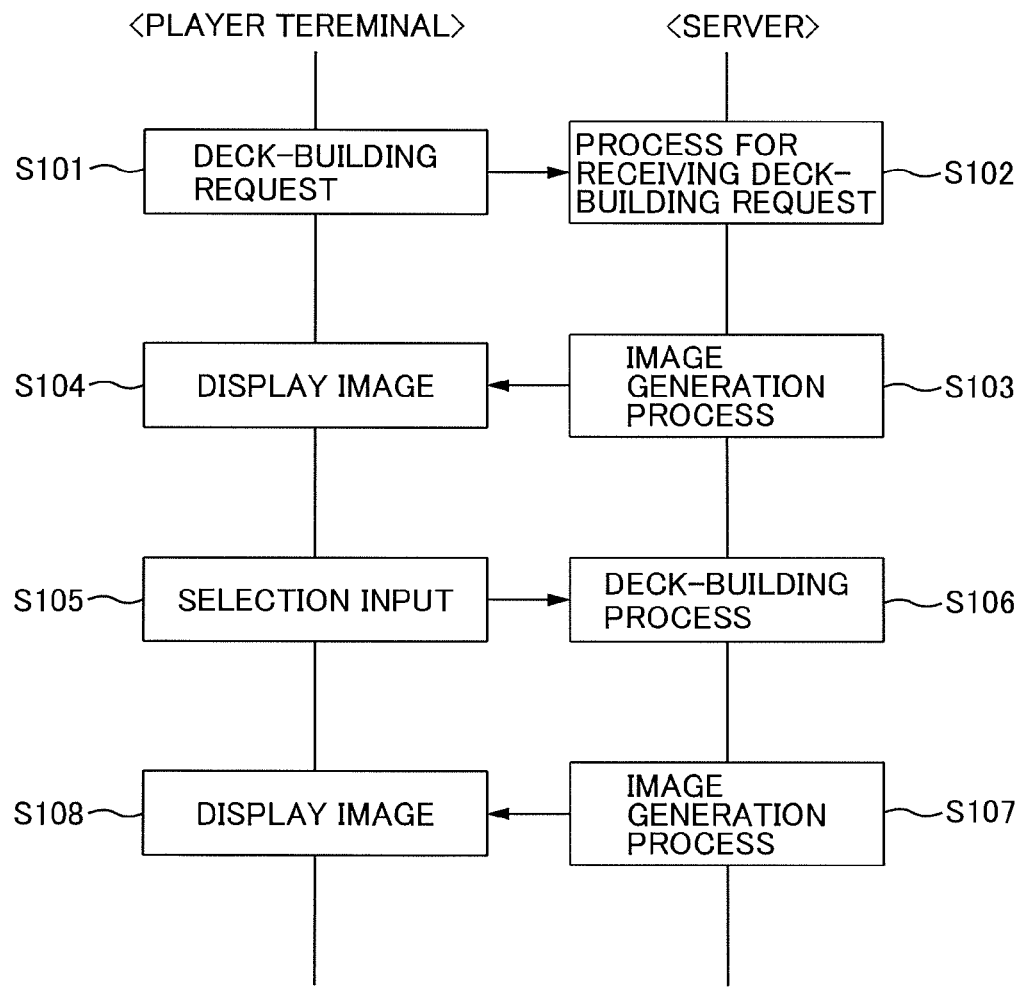
FIG. 12 is a flowchart for illustrating an example of operations which are for building a deck.
Figure 13:
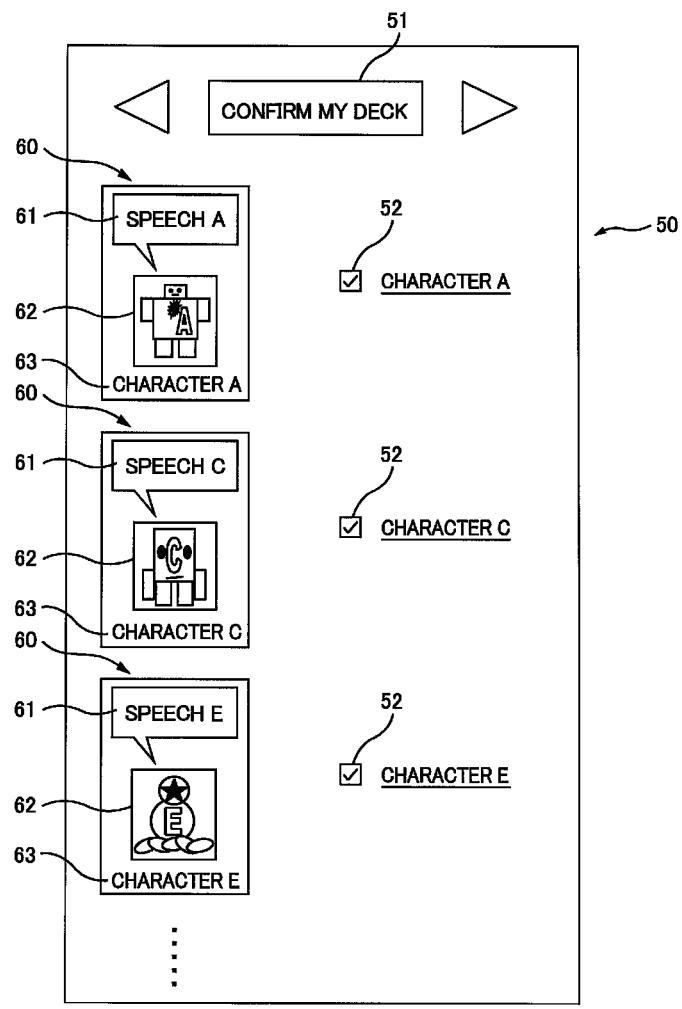
FIG. 13 is an example of a game image at the time of building the deck.

A deck-building process is one in which a deck is built in response to a request from the player terminal 20, the deck composed of the set of a plurality of characters selected by a player. An example of operations for building the deck will be described below with reference to FIGS. 12 and 13. FIG. 12 is a flowchart for illustrating an example of operations for building a deck. FIG. 13 is an example of a game image at the time of building the deck.

First, on the player terminal 20, a player accesses a web page for starting to build his/her deck and the web page is displayed on the terminal display unit 24. As shown in FIG. 12, the player operates the terminal input unit 23, and thereby requests starting of building his/her deck. That is, when receiving from the terminal input unit 23 an input signal to start building the deck, the terminal control unit 21 sends to the server device 10 a command to request building of the deck (building request) (S101).

Subsequently the server device 10 performs a reception process in which the server device 10 receives the building request from the player terminal 20 via a network 2 (S102). Then, when the reception unit 113 of the server device 10 receives the building request sent from the player terminal 20, the image generation unit 116 of the server device 10 performs a process for generating the deck-building game image 50 shown in FIG. 13 (S103). In the deck-building game image 50, displayed is a list of the game cards 60 (a list of characters) owned by the player. The player can select characters for building his/her deck from the list.

Specifically, the deck building unit 115 of the server device 10 refers to owned-card information shown in FIGS. 5 and 6, and retrieves owned cards owned by the player. For each of the owned cards that have been retrieved, the deck building unit 115 causes the image generation unit 116 to generate the images of the game cards 60 shown in FIG. 13. Each game card 60 includes the speech 61 of the character, the image 62 of the character, and the name 63 of the character.

More specifically, after retrieving the speech ID associated with each owned card by referring to the owned-card information shown in FIG. 6, the deck building unit 115 refers to the speech information shown in FIG. 10, and retrieves the speech correlated to the speech ID. Based on the speech that has been retrieved in this manner, the deck building unit 115 causes the image generation unit 116 to generate the game card 60 including the speech 61 of the character. Further, the deck building unit 115 refers to the card information shown in FIG. 4, and retrieves the character image correlated to the card ID of each owned card. Based on the character image that has been retrieved in this manner, the deck building unit 115 causes the image generation unit 116 to generate the game card 60 including the image 62 of the character. Furthermore, the deck building unit 115 refers to the card information shown in FIG. 4, and retrieves the character name correlated to the card ID of each owned card. Based on the character name that has been retrieved in this manner, the deck building unit 115 causes the image generation unit 116 to generate the game card 60 including the name 63 of the character. As mentioned above, when generating the game card 60, the image generation unit 116 combines the speech 61, the name 63 (both text data) and the character image 62 (image data) of a character. This makes it possible, for example, to change a speech from one to another, or to change a correspondence between the image and the speech of a character.

Thus, when the image generation unit 116 generates the deck-building game image 50 including the list of the game cards 60 owned by the player, the communication unit 15 sends the generated deck-building game image 50 to the player terminal 20.

When the player terminal 20 receives the deck-building game image 50 sent from the server device 10, the deck-building game image 50 is displayed on the terminal display unit 24 and the player terminal 20 receives an operational input from the player (S105). The deck-building game image 50 includes, as shown in FIG. 13: a deck determination button 51 for determining the deck; and check boxes 52 respectively correlated to the game cards 60 (characters). The player can turn on the check boxes 52 by operating the terminal input unit 23, and thereby can select a plurality of characters constituting his/her deck. At this stage, if the player builds his/her deck (selects characters) so that a deadly attack (special effect) is activated, this favors the player in the game progress.

In order to activate the deadly attack, the characters constituting the deck should be selected so that the skills of the characters have a special relationship (in the present embodiment, deadly attack will not be activated unless the skills of the characters constituting the deck are the same). However, in the present embodiment, the deck-building game image 50 shows merely speeches 61 of the characters correlated to character images 62. Therefore, the player cannot promptly identify the skill of each character even if the player reads a speech 61 of the character. That is, the player estimates the skill of the character using its speech as clues and uses various characters. This makes it possible to avoid falling into a few fixed groups of the characters used for building a deck. Thus, the player selects characters constituting his/her deck while estimating the characters' skills and presses the deck determination button 51. Then, a plurality of the characters selected by the player are organized into the player's deck.

It is also acceptable that, when the player selects a plurality of characters constituting his/her deck, a set of characters predetermined by the deck building unit 115 is displayed in the deck-building game image 50 and the player selects characters among them. In this case, a set of characters constituting a deck in which a deadly attack has already been activated may be displayed in deck-building game image 50.

Subsequently, the player turns on the check box 52 in the deck-building game image 50 and presses a deck determination button 51. Then, the player terminal 20 sends to the server device 10 the followings: the card IDs of a plurality of the characters selected by the player; and a command that requests registering of the deck into which the plurality of selected characters are organized.

Next, when the reception unit 113 receives the command, the server device 10 performs the deck-building process (S106). That is, the deck building unit 115 correlates the received card IDs of a plurality of the characters to a deck ID of the player's deck information (see FIG. 7) and stores them. At this stage, the deck building unit 115 refers to the card information shown in FIG. 4, and thereby identifies the skills respectively correlated to the card IDs of the plurality of characters. The deck building unit 115 judges whether these skills are the same or not. If it is judged that the skills are the same, the deadly technique ID in accordance with the type of the skill that all characters constituting the deck have is determined based on the determination conditions of the special effects shown in FIG. 8. Then, the deck building unit 115 correlates the deadly technique ID determined to a deck ID and stores it in the player's deck information (see FIG. 7). In addition, that the deck building unit 115 has determined the deadly technique ID as mentioned above means that the deadly attack is activated for the deck. Therefore, the flag for the deadly technique ID that have been determined is set to "TRUE", and the player's illustration-list information (see FIG. 9) is updated.

The deck building unit 115 causes the image generation unit 116 to generate a game image indicating that the registration of the deck into which the characters selected by the player are organized is completed. The deck building unit 115 sends the game image to the player terminal 20 (S107).

The terminal control unit 21 of the player terminal 20 causes the received game image to be displayed on the terminal display unit 24, and thereby it is possible to notify the player of the registration of the deck into which the characters selected by the player are organized (S108).

As mentioned above, with the game system 1 according to the present embodiment, when a player builds his/her deck, the player estimates the skills associated with the characters and uses various characters. This makes it possible to avoid falling into a few fixed groups of the characters used for building a deck.

Card-Combining Process

The card-combining process is one in which a plurality of game cards are combined to foam one game card. When receiving from the player terminal 20 an operational signal that requests combining of game cards, the control unit 11 of the server device 10 starts the card-combining process. The card-combining process will be described in detail below.

First, when receiving from the terminal input unit 23 an operational signal for selecting some game cards, the terminal control unit 21 of the player terminal 20 sends to the server device 10 the card IDs of a plurality of game cards (a main card and sub cards) selected by the player. And, the terminal control unit 21 sends to the server device 10 a command that requests combining of the game cards (card-combining request).

Subsequently, when receiving such a card-combining request, the server device 10 performs a process for increasing parameter values of the main card, of the main and the sub cards selected by the player. That is, the control unit 11 of the server device 10 uses the card ID of the main card as a key and refers to owned-card information (see FIG. 6) stored in the data storage unit 12. Thereby, acquired are the values of parameters such as the attack power and the defense power associated with the main card. The control unit 11 acquires new values of these parameters by adding predetermined values to the old values of these parameters. The control unit 11 records the new values in the owned-card information (see FIG. 6) and updates the owned-card information. At this stage, the sub card are deleted from the owned-card information (see FIG. 6) (or, a flag indicative of "not owned" is set to the sub card). Therefore, after the combining, the player owns only the main card (game card made by the combining) having the new parameters.

Further, when receiving the card-combining request, the server device 10 performs a process for changing the speech of the main card, of the main and the sub cards selected by the player. That is, the control unit 11 of the server device 10 uses the card ID of the main card as a key and refers to the owned-card information stored in the data storage unit 12 (see FIG. 6). Thereby the control unit 11 acquires the speech ID which is set for the main card. Then, the control unit 11 refers to the speech information (see FIG. 10), and thereby selects a speech ID which differs from the acquired speech ID. The control unit 11 records the new, selected speech ID in the owned-card information (see FIG. 6) and updates the owned-card information.

It is also possible that speeches that can cause a player to easily estimate the skill of a character are distinguished from speeches that cannot do so, and pre-store the difference in the speech information. In this case, the control unit 11 may count the number of times that a card has been combined and, every time when the number increases, the control unit 11 may select as a new speech a speech which can cause the player to easily estimate the skill of that character.

When changing the speech of the main card while combining cards, the control unit 11 may change the speech by changing the card ID of the main card to the card ID of another game card.

As mentioned above, with the game system 1 according to the present embodiment, when combining characters, the speech is changed. Therefore, when a player builds his/her deck, the player further estimates the skill associated with the character made by the combining and uses various characters.

This makes it possible to further avoid falling into a few fixed groups of the characters used for building a deck.

Process for Causing Player to View Illustration List

Figure 14:
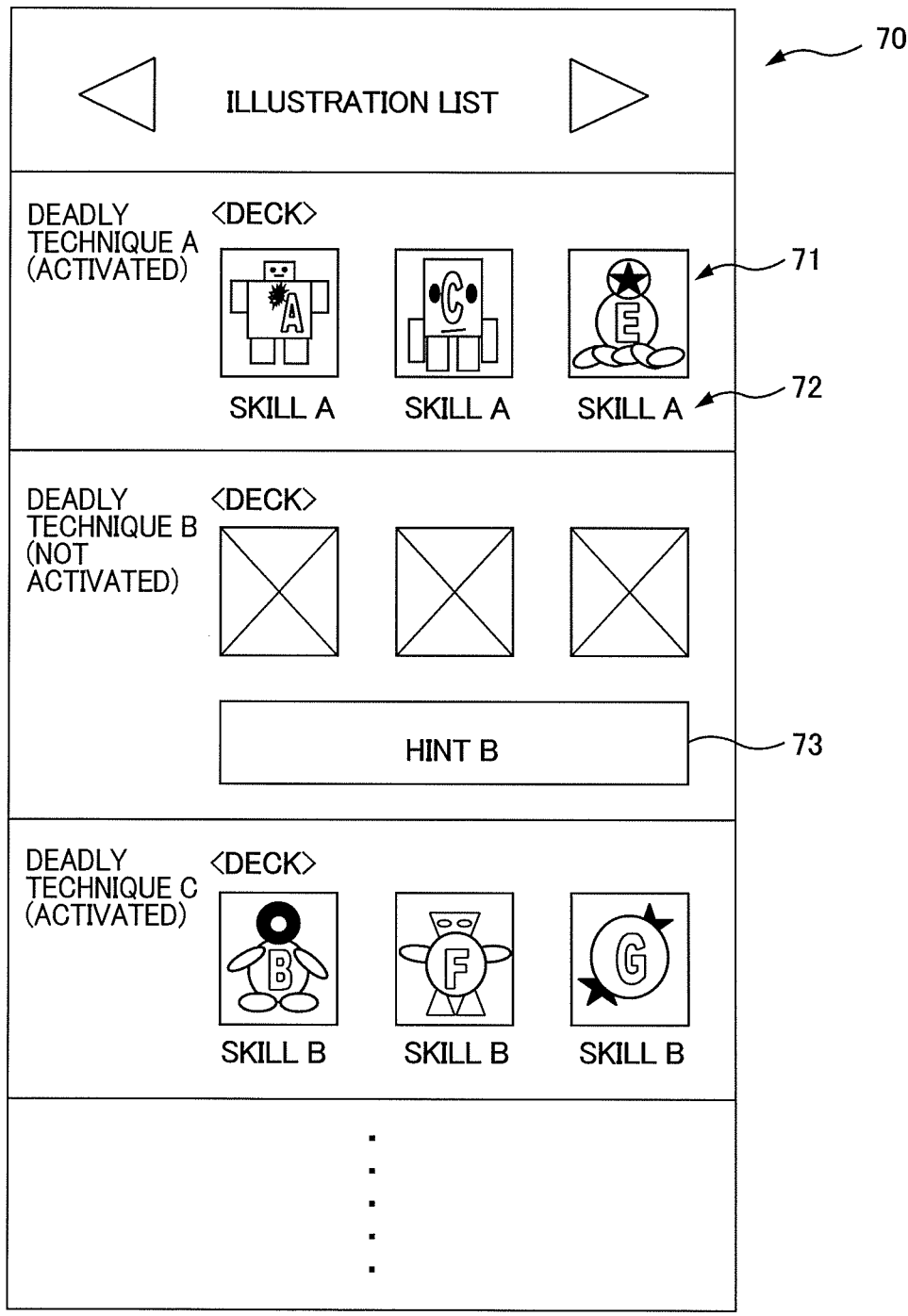
FIG. 14 is an example of a game image at the time of viewing an illustration list.

A process for causing a player to view the illustration list is one in which the decks that the player has ever built are viewed in response to a request from the player terminal 20. An example of operations for viewing the illustration list will be described with reference to FIG. 14. FIG. 14 is an example of a game image at the time of viewing the illustration list.

First, on the player terminal 20, a player accesses a web page for starting to view the illustration list and the web page is displayed on the terminal display unit 24. The player operates the terminal input unit 23, and thereby requests starting of viewing the illustration list. That is, when receiving from the terminal input unit 23 an input signal to start viewing the illustration list, the terminal control unit 21 sends to the server device 10 a command to request starting of viewing the illustration list (viewing request).

Subsequently the server device 10 performs a reception process in which the server device 10 receives the viewing request from the player terminal 20 via the network 2. When the reception unit 113 of the server device 10 receives the viewing request sent from the player terminal 20, the image generation unit 116 of the server device 10 performs a process for generating the illustration list 70 (history game image) shown in FIG. 14. In the illustration list 70, displayed is a list of the decks that the player has ever built.

Specifically, the illustration-list information shown in FIG. 9 is correlated to the flag information indicating whether or not a deadly attack is activated for the deadly technique ID of each deck. Therefore, the control unit 11 of the server device 10 refers to the flag information, and thereby retrieves the deadly technique IDs corresponding to the activated deadly attacks. Thereafter, the control unit 11 of the server device 10 refers to the deck information shown in FIGS. 5 and 7, and thereby retrieves the decks corresponding to the deadly technique IDs. Then, based on the decks retrieved as mentioned above, the control unit 11 instructs the image generation unit 116 to generate the illustration list 70 shown in FIG. 14.

As shown in FIG. 14, the decks in which their deadly attacks are activated are displayed in the illustration list 70 with showing the character images 71 of the characters constituting the decks, the skills 72 of the characters, and the like. On the other hand, the deck in which its deadly attack is not activated is displayed without the characters constituting the deck, but a hint 73 for activating the deadly attack appears.

Specifically, the control unit 11 refers to the card information shown in FIG. 4 and retrieves the character images associated with the card IDs of the characters (game cards) constituting the deck. Based on the character images retrieved as mentioned above, the control unit 11 causes the image generation unit 116 to generate the illustration list 70 including the character images 71. Further, the control unit 11 refers to the owned-card information shown in FIG. 6 and retrieves the skills associated with the card IDs of the characters (game cards) constituting the deck. Based on the skills retrieved as mentioned above, the control unit 11 causes the image generation unit 116 to generate the illustration list 70 including the skills 72 of the characters constituting the deck. Further, the control unit 11 refers to the illustration-list information shown in FIG. 9 and retrieves the deadly technique IDs whose flags are set to "FALSE" (deadly technique IDs for which a deadly attack is not activated). Thereafter, the control unit 11 refers to the deck information shown in FIG. 7 and the special effect information shown in FIG. 11, and the control unit 11 retrieves the hints for the decks whose deadly attacks are not activated. Then, based on hints retrieved as mentioned above, the control unit 11 causes the image generation unit 116 to generate the illustration list 70 including the hints 73 for the decks whose deadly attacks have not been activated, the hints 73 being clues for activating the deadly attacks. This enables a player to consider the hints and to build his/her deck so as to activate a deadly attack in the deck in which a deadly attack has not been activated.

When the illustration list 70 including a list of the decks that have ever been built by the player is generated by the image generation unit 116 as mentioned above, the generated illustration list 70 is transmitted to the player terminal 20 by the communication unit 15.

As mentioned above, with the game system 1 according to the present embodiment, when a player builds his/her deck, the player refers to the decks that the player has ever built, and thereby the player uses various characters. This makes it possible to avoid falling into a few fixed groups of the characters used for building a deck.

Compared to managing the speeches of characters as image data, managing the speeches of the characters in text format makes it easier to change the speech corresponding to a character In the case of changing a condition of producing the special effects or the designs of game cards.

Other Embodiments

The present embodiment facilitates understanding of the present invention and does not intend to limit the interpretation of the present invention. Variations and modifications may be made in accordance with the spirit and scope of the present invention and equivalents thereof are included in the present invention. In particular, embodiments described below are to be included in the present invention.

Deck-Building Game Image

Figure 15:
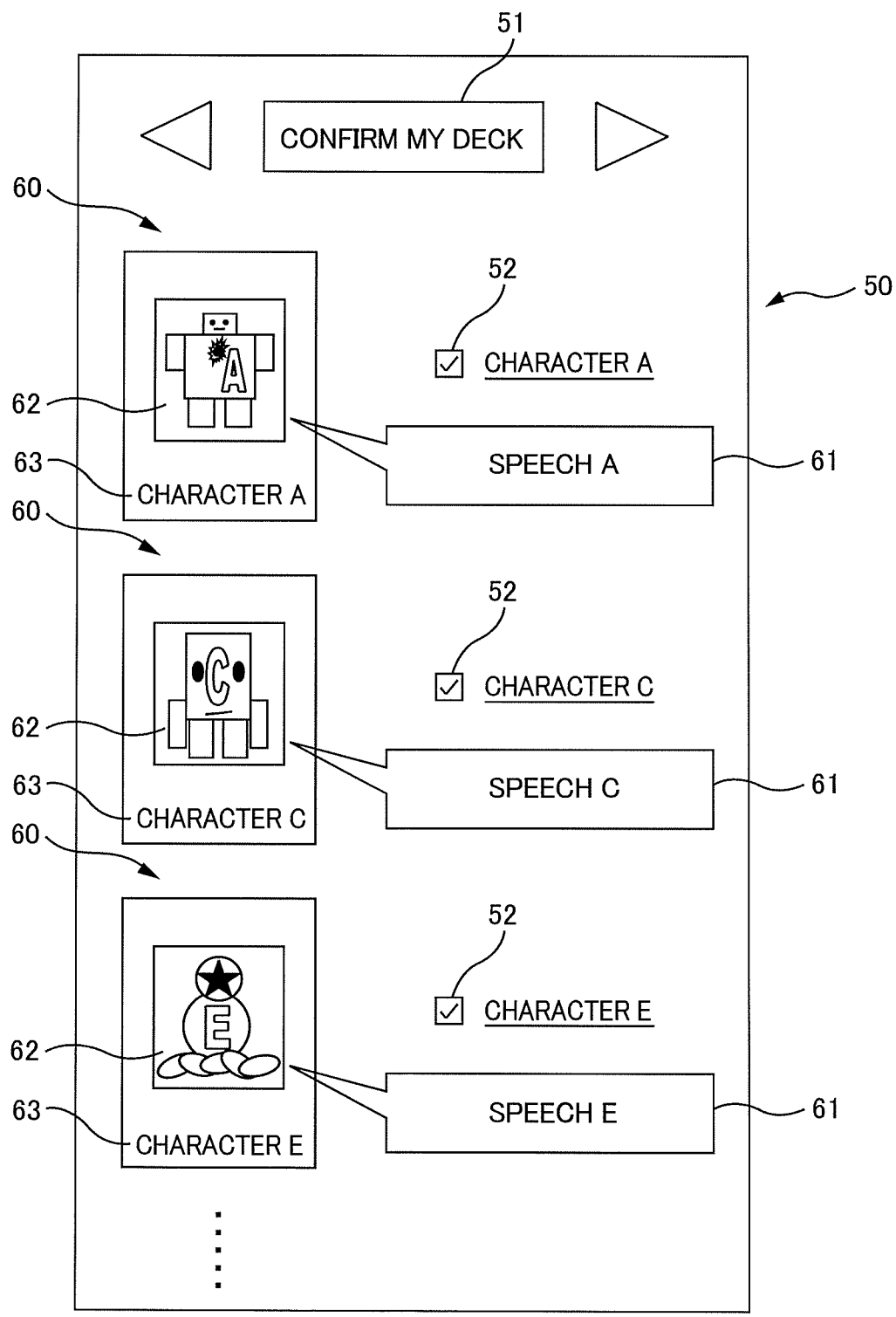
FIG. 15 is another example of a game image at the time of building the deck.

In the present embodiment mentioned above, as an example of deck-building game image generated by the image generation unit 116, provided is the deck-building game image 50 shown in FIG. 14. However, the invention is not limited thereto. The deck-building game image 50 shown in FIG. 15 may be employed. That is, it is not necessary for the image of a game card 60 to include the speech 61 and the character image 62 of a character, as in the deck-building game image 50 shown in FIG. 14. It is acceptable that the image of the game card 60 does not include the speech 61 of the character, as in the deck-building game image 50 shown in FIG. 15. In other words, it is sufficient that the image generation unit 116 generates the deck-building game image 50 in which the speech 61 of the character is correlated to the character image 62.

Special Effect

In the present embodiment mentioned above, as an example of the cases in which the condition for producing a special effect is the relationship of the skills (attributes) that are set for a plurality of characters constituting a deck to each other, described is the case where the skills of the characters constituting the deck are the same. However, the invention is not limited thereto. For example, the following setting may also be employed: all the three characters constituting the deck are not required to have the same skill, and a special effect can be produced if the skills of two of the characters are the same. Also, an all-powerful card that has all skills may be used. In this case, For example, a group composed of two characters which has the same skill and one all-powerful card may serve as three characters constituting the deck. It is also acceptable that a special effect is not produced in exceptional conditions like some characters in the plurality of characters constituting a deck are the same.

Further, in the present embodiment mentioned above, deadly attack is described as an example of special effect. However, the invention is not limited thereto. For example, the skill values (parameter values) of all characters constituting a deck may increase.

Suggesting Information

In the present embodiment, the speech of a character is described as an example of the suggesting information that causes a player to estimate the skill (attribute) which is set for the character. However, the invention is not limited thereto. For example, symbols, cryptograms, patterns, geometrical figures, etc. that cause a player to estimate the skill (attribute) set for a character may also be employed.

Illustration List

In the present embodiment, a special reward such as an game item may be offered to a player when the player causes all deadly attacks to be activated as a result of building his/her decks (when all his/her decks are displayed in the illustration list).

Server Device

The present embodiment has described the game system 1 including the single server device 10 as an example. However, the present invention is not limited in this way. A plurality of server devices may be connected via a network, and each server device may execute various types of distributed processing.

Information Processing Device

In the game system 1 according to the present embodiment, described is an example in which the server device 10 and the user terminal 20 cooperate based on the game program to execute the following processes: the card-offering process; the card-recording process; the process for causing a player to build his/her deck; the card-combining process; the process for causing the player to view the illustration list; and the like. However, the invention is not limited thereto. Based on the game program, the foregoing processes may be executed only by the user terminal 20 serving as a information processing device, or only by the server device 10 serving as a information processing device.

Note that the information processing device is a computer having a processor and a memory.

What is claimed is:

1. A non-transitory computer-readable storage medium, with a game program stored thereon, wherein the game program comprises instructions that when executed cause a computer, having a processor and a memory, to:

perform a reception process wherein a building request that requests building of a character group, into which a plurality of characters are organized, is received from a player terminal that is used by a player when the player plays a game;

perform an image generation process wherein a group-building game image is generated in response to the building request, and wherein the group-building game image is displayed on a display unit of the player terminal when the player builds the character group, and wherein the group-building game image comprises images of characters owned by the player and suggesting information that allows the player to estimate an attribute associated with each of the characters and does not directly display an attribute associated with the characters; and perform a process wherein the group-building game image generated in the image generation process is sent to the player terminal.

2. A non-transitory computer-readable storage medium according to claim 1, wherein when the attributes associated with a plurality of characters constituting the character group are related to each other, the instructions cause the computer to perform a process wherein a special effect is produced in the character group.

3. A non-transitory computer-readable storage medium according to claim 2, wherein the instructions further cause the computer to perform an image generation process wherein a history game image is generated, and wherein the history game image comprises a history of the character group that the player has previously built and an attribute associated with the characters constituting the character group in which the special effect is produced.

4. A non-transitory computer-readable storage medium according to claim 1, wherein the suggesting information is text data containing a character string that allows the player to estimate the attribute associated with the character, and wherein in the image generation process, the group-building game image further comprises a text containing the character string which corresponds to an image of the character.

5. A non-transitory computer-readable storage medium according to claim 1, wherein in the image generation process, the instructions further cause the computer to perform a process which allows a first character of the plurality of characters constituting the character group and a second character that differs from the first character to be combined, such that the suggesting information of the first character is changed, and generates a group-building game image comprising the suggesting information that has been changed.

6. A server device, comprising:

a reception unit configured to receive a building request that requests building of a character group into which a plurality of characters are organized, from a player terminal that is used by a player when the player plays a game;

an image generation unit configured to generate a group-building game image in response to the building request, wherein the group-building game image is displayed on a display unit of the player terminal when the player builds the character group, wherein the group-building game image comprises images of characters owned by the player and suggesting information that allows the player to estimate an attribute associated with each of the characters and does not directly display an attribute associated with the characters; and a transmission unit configured to send to the player terminal the group-building game image generated by the image generation unit.

* * * * *